Figure 1:
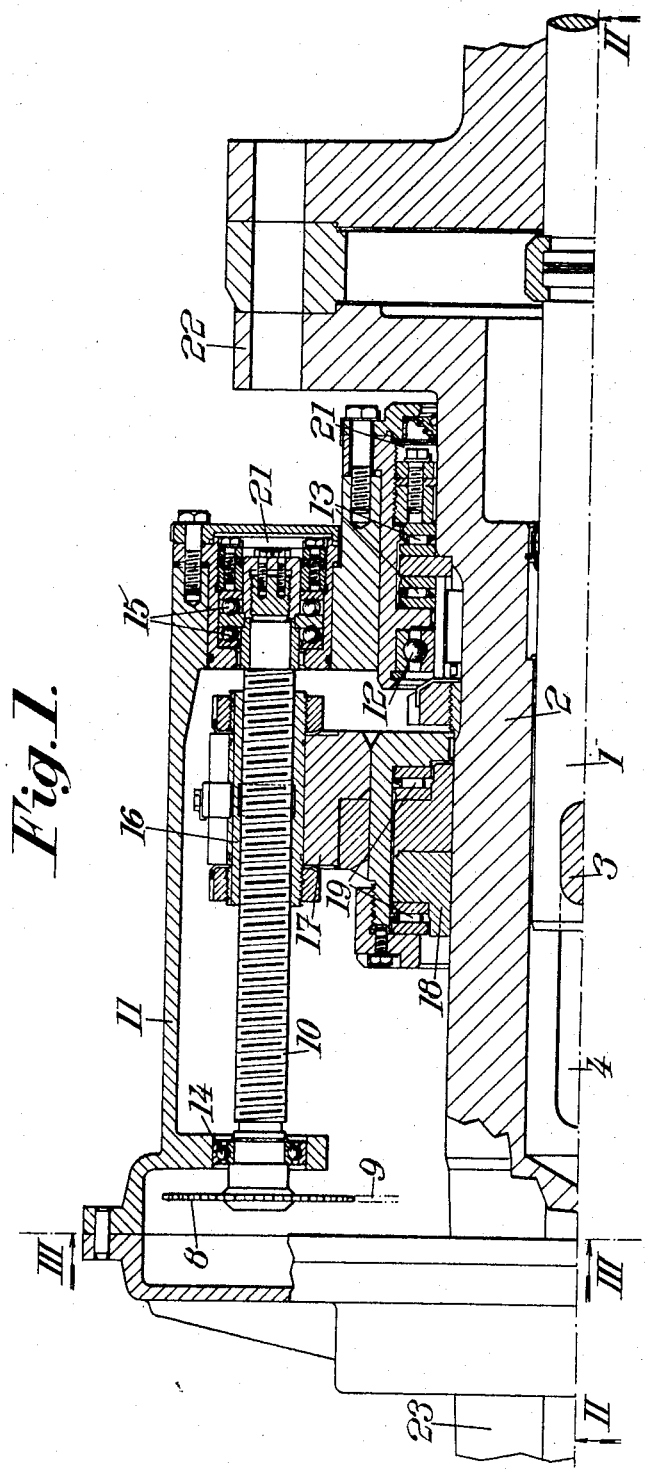

United States Patent [19]
Amiot

[11] 3,833,314
[45] Sept. 3, 1974

[54] DEVICES FOR CONTROLLING THE RELATIVE AXIAL MOVEMENTS OF TWO COAXIAL ROTARY SHAFTS

[75] Inventor: Félix Amiot, Paris, France

[73] Assignee: Constructions Mecaniques De Normandie, Paris, France

[22] Filed: Jan. 18, 1973

[21] Appl. No.: 324,658

[30] Foreign Application Priority Data
Jan. 25, 1972 France .................. 72.02424

[52] U.S. Cl. ................ 416/164, 416/160, 416/165
[51] Int. Cl. ................................................ B63h 3/04
[58] Field of Search ........... 416/164, 165, 163, 160; 74/89, 15

[56] References Cited
UNITED STATES PATENTS
2,054,810  9/1936  Gaba .......................... 416/165 X
2,360,982  10/1944  Sahle .......................... 416/163 X FOREIGN PATENTS OR APPLICATIONS
624,677  8/1961  Canada ........................... 416/163
860,205  2/1961  Great Britain ................ 416/163

*Primary Examiner*—Everette A. Powell, Jr.
*Attorney, Agent, or Firm*—Larson, Taylor & Hinds

[57] ABSTRACT

A rod is arranged axially at the centre of a rotary hollow shaft. A drive motor actuates through gear wheels and chains the rotation of two threaded rods parallel to the shaft and fixed axially each coacting with a nut fast axially to the rod through a mechanism, roller stops, a ring and a cotter pin. The device is particularly useful for controlling the variations in orientation of the propeller blades of a boat.

10 Claims, 3 Drawing Figures

DEVICES FOR CONTROLLING THE RELATIVE AXIAL MOVEMENTS OF TWO COAXIAL ROTARY SHAFTS

The invention relates to devices for controlling the longitudinal sliding movements of a rod arranged axially at the centre of a hollow rotary shaft, which devices comprise: a cotter pin fast to the rod to be controlled and passing diametrically through a suitable opening of the hollow shaft; a drive shaft; and means working by screwing to convert the rotation of the drive shaft into axial movements of the cotter pin.

It relates more particularly (because it is in this case that its application seems to offer the most advantage), but not exclusively, among these devices, to those for which the rod is arranged so as to control the variations in orientation of the blades of a propeller mounted on one end of the hollow shaft and rotated with this shaft, especially for the purposes of propelling a boat.

It is a particular object of the invention to render these devices such that they respond to the various exigencies of practice better than hitherto, especially in so far as they are less cumbersome, less expensive and consume less energy.

The invention consists principally in including with means for converting the rotation of the drive shaft to axial movements of the cotter pin: at least two threaded rods whose axes are parallel to that of the hollow shaft, which rods are immobilised in the axial direction with respect to this hollow shaft and rotated around their axes by the drive shaft, preferably by means of chains and gear wheels; a nut mounted on each of these rods; and an assembly fast to said nuts and rigidly fixed axially, but not angularly, with the cotter pin, preferably by means of two ball or roller stops.

It comprises, apart from this main feature, certain other features which are preferably used at the same time and which will be more explicitly considered below.

It relates more particularly to a certain type of application (that for which it is applied to the control of the variations in orientation of the propeller blades of ships), as well as to certain embodiments, of said features; and it relates more particularly again, and this by way of new industrial products, to control devices of the type concerned involving the application of these same features, as well as the special elements (such as the threaded rods and movable mechanisms) adapted to their construction and assemblies equipped with such devices.

The invention will in any case be well understood by means of the complement of description which follows, as well as of the accompanying drawings, which complement and drawings are of course given primarily by way of illustration and are not to be considered as limiting.

Figure 2:
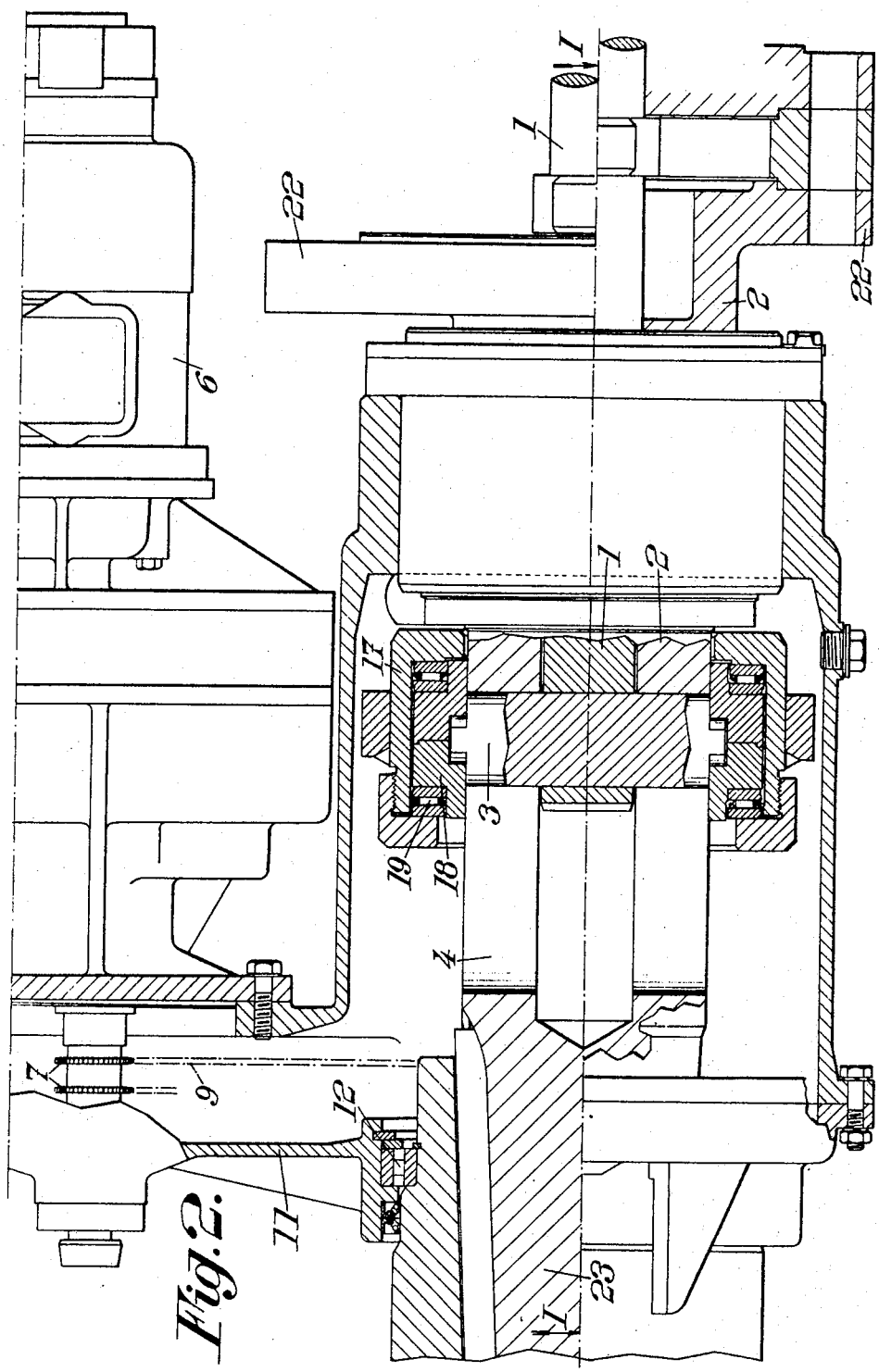
Figure 3:
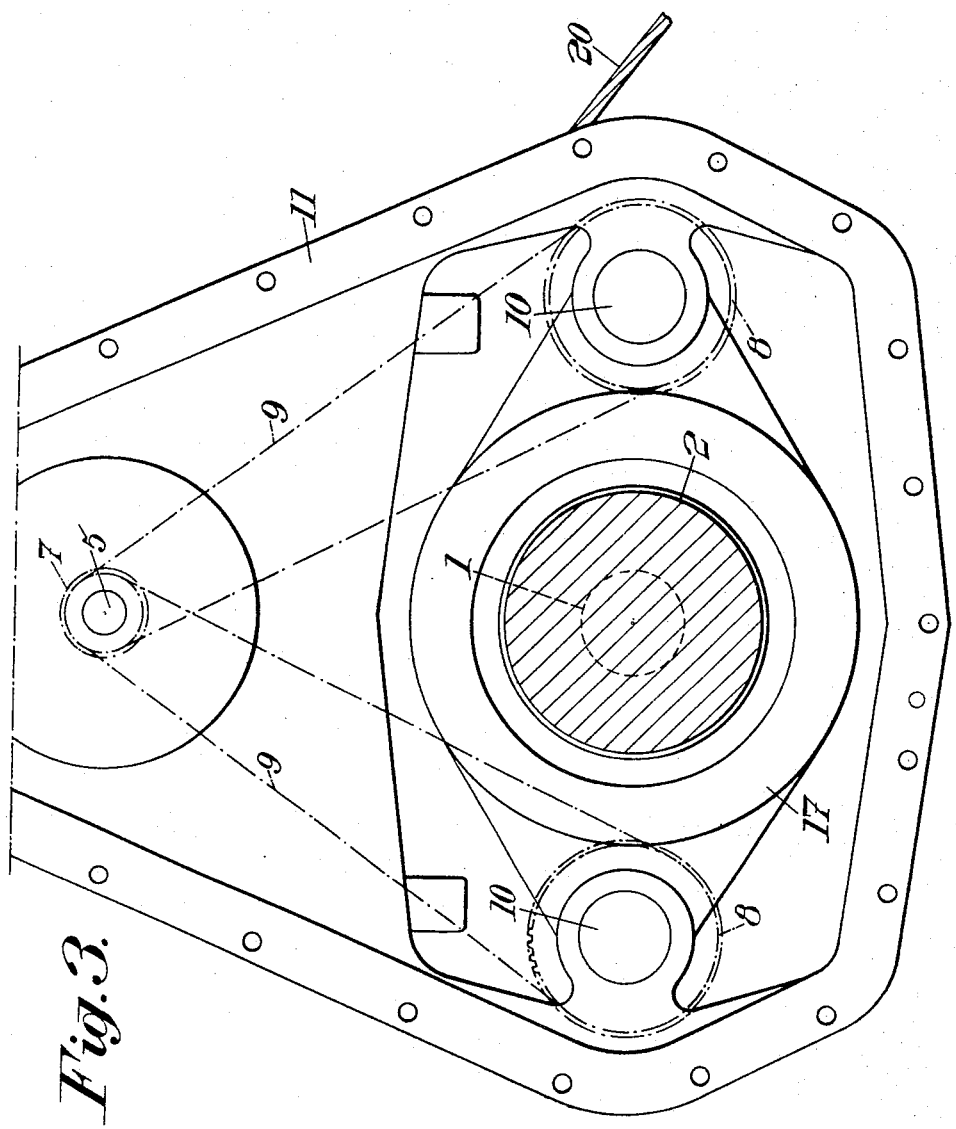

FIGS. 1, 2 and 3 of these drawings show, respectively in horizontal axial half-section along the line I—I of FIG. 2, in partial vertical section along the line II—II of FIG. 1 and in partial cross-section along the line III—III of FIG. 1, one embodiment of a device constructed according to the invention for controlling the variations in orientation of the blades of a propeller.

According to the invention, in order for example to construct a device for controlling the longitudinal sliding movements of a rod 1 arranged axially at the centre of a hollow rotary shaft 2, in order to cause the variation in manner known in itself of the orientation of the blades of a ship's propeller mounted on one of the ends of this shaft, procedure is as follows or in analogous manner.

Before entering into the detail of the subject, it will be recalled that, in order to control such sliding movements, it has already been proposed to fix rigidly with the central rod a cotter pin 3 passing diametrically through an elongated aperture 4 formed in the hollow shaft and to cage this cotter pin in a ring immobilised in rotation except in its manipulating phases, which ring comprises on one hand an outer threading coacting with a tangential control screw and on the other hand an inner threading coacting with the outer threading of an axially immobilised sleeve, coaxial with the hollow shaft 2 and surrounding this hollow shaft; with such a device, the axial movements of the cotter pin are ensured by the rotations of the tangent screw, but this device is very cumbersome, comprises heavy and expensive parts and consumes a great deal of energy, the diameters of the threadings which coact between themselves being relatively large.

These drawbacks are overcome, according to the invention, by replacing the single ring-sleeve-tangent screw assembly above by at least two threaded rod-nut assemblies of small diameter distributed regularly around the hollow shaft.

In the preferred embodiment of the invention which has been illustrated in the drawings, the number of these assemblies is two, diametrically opposite with respect to the hollow shaft.

More specifically, the movement of the output shaft 5 of a reducing gear assembly 6 is transmitted through gear wheels 7,8 and chains 9, to two threaded rods 10 parallel to the axis of the hollow shaft 2 and arranged on both sides of the shaft.

These two rods 10 are mounted, like the shaft 5 on a frame 11 itself borne by said shaft through roller bearings 12 and connected axially to the latter by roller stops 13, the rotary freedom of these rods 10 on themselves being ensured by mounting bearings 14 and their axial immobilisation in the oil sump-base 11, by roller or ball stops 15.

Each rod 10 carries a nut 16 fast to a mechanism 17 and a cotter pin 3 is caged in this mechanism by means of a ring 18 and roller stops 19, so that it can turn freely in the latter whilst being axially connected with it.

Preferably the rods 10 and nuts 16 are constituted so that friction between these elements is reduced to the minimum, each rod-nut assembly being for example of the "roller-screw" type (planet or recirculating ball-or roller-screw and in particular of the type, of these roller screws in which the threadings of the rod and of the nut are connected between themselves by means of a crown of threaded satellite rollers with axes parallel to those of this rod and of this nut.

There will also be seen in the drawings:
a fixing element 20 (FIG. 3) intended to fix the frame 11 with respect to the hull of the boat,
adjusting boxes 21 (FIG. 1) with fluid-tight screwed covers lubricated by the oil from the sump-base 11, a flange 22 and a frustroconic stub shaft 23 forming part of the central portion of the hollow shaft 2 and enabling its connection with the propeller-bearing section and the output shaft of the driving mechanism of the ship respectively.

The operation of such a device will be easily understood. To displace the rod 1 longitudinally in one direction, it suffices to make the drive-shaft 5 turn in the appropriate direction, the rotations of this shaft being translated into those of the threaded rods 10 and hence into the axial sliding movements of the nuts 16 and of the mechanism 17, which entrains the cotter pin 3; in the same way the actuation of the rod 1 in the reverse direction is ensured by rotation of the shaft 5 in the opposite direction to the previous one.

These longitudinal movements of the rod 1 in the hollow shaft 2 are exploited in any known desirable way to cause the orientation of the blades of a propeller borne by said hollow shaft to vary.

The control device which has just been described has numerous advantages with respect to those known hitherto, especially as regards:

the possibility of ensuring the desired adjustment of the blades of the propeller without stopping this propeller,
the reduced bulk, especially in the axial direction,
the relatively low cost,
and the low energy consumption by reason of the small diameter of the rods and nuts in engagement.

Purely by way of illustration, it is indicated that the power ratings of ships equipped with the previously known construction (single screw-nut assembly) remained below 300 CV and that for a ship of 800 CV, the power necessary to move the control rod of the blades of the propeller over a total longitudinal stroke of 60 mm in 12 seconds would have been of the order of 7.6 CV with such a prior art construction (the diameter of the threading of the single screw-nut assembly then being of the order of 225 mm) whilst it is only 1.8 CV — namely four times less — with the construction according to the invention applying to parallel frictional screws of 40 mm diameter, this power rating dropping to 0.95 CV —namely eight times less — if these two screws are recirculating ball-or roller-screws.

Screws of as small a diameter as 30 mm are sufficient to control the propeller of a 600 CV ship.

As is self-evident the invention is in no way limited to those of its types of application and embodiments which have been more especially envisaged; it encompasses, on the contrary all modifications, especially:

those in which the axially movable central rod would have a function other than the control of the orientation of the blades of a marine propeller, for example control of a clutch or that of a brake,
and those where the drive shaft 5 would be driven, at least provisionally, by means other than a gear reduction assembly, for example by a hand-operated lever.

I claim:

1. Device for controlling the longitudinal sliding movements of a rod for controlling the orientation of the blades of a ship's propeller, said rod being arranged axially at the center of a hollow rotary shaft and rotated with said shaft, comprising: a cotter pin fast to the rod and passing diametrically through a longitudinal opening of the hollow shaft; a drive shaft; means working by screwing to convert the rotation of the drive shaft into axial movements of the cotter pin in said longitudinal opening, said means comprising: at least two threaded rods of which the axes are parallel to that of the hollow shaft, which rods are immobilised in the axial direction with respect to this hollow shaft and the ship and rotated around their axes by the drive shaft; a nut mounted on each of these rods; and an assembly fast to said nuts and rigidly fixed axially, but not angularly, to the cotter pin.

2. Control device according to claim 1, wherein the threaded rods are driven by the drive shaft through chains and gear wheels.

3. Control device according to claim 1, wherein said assembly is rigidly fixed to the cotter pin by means of two ball or roller stops.

4. Control device according to claim 3, comprising, interposed between the two ball or roller stops and the cotter pin, a ring surrounding the hollow shaft.

5. Control device according to claim 1, wherein the number of threaded rods is two and these rods are diametrically opposite with respect to the axis of the hollow shaft.

6. Control device according to claim 1, wherein the diameters of the threaded rods are relatively small.

7. Control device according to claim 1, applied to the control of the variations in orientation of the blades of a propeller mounted on one of the ends of the hollow shaft and rotated by this shaft.

8. Control device according to claim 6, relating to the control of the propeller blades of a boat of 600 to 800 CV, wherein the diameters of the threaded rods are of the order of 30 to 40 mm.

9. Control device according to claim 2, wherein said assembly is rigidly fixed to the cotter pin by means of two ball or roller stops.

10. Control device according to claim 7, relating to the control of the propeller blades of a boat of 600 to 800 CV, wherein the diameters of the threaded rods are of the order of 30 to 40 mm.

* * * * *